United States Patent

Collins et al.

[15] 3,692,941

[45] Sept. 19, 1972

[54] DATA EXCHANGE AND COUPLING APPARATUS

[72] Inventors: Arthur A. Collins; John Dan Hill, III, both of Dallas, Tex.

[73] Assignee: Collins Radio Company, Dallas, Tex.

[22] Filed: Sept. 23, 1970

[21] Appl. No.: 74,669

[52] U.S. Cl. ....................179/15 AL, 179/15 BS

[51] Int. Cl. ....................H04j 3/08

[58] Field of Search ....................179/15 AL, 15 BS

[56] References Cited

UNITED STATES PATENTS 3,544,976 12/1970 Collins ....................179/15 AL

*Primary Examiner*—Ralph D. Blakeslee
*Attorney*—Robert J. Crawford and Bruce C. Lutz

[57] ABSTRACT

A coupling device for coupling a low speed multiplexed data exchange loop with a higher speed multiplexed data exchange loop.

7 Claims, 2 Drawing Figures

INVENTORS.
ARTHUR A. COLLINS
JOHN DAN HILL
BY Bruce C Lutz
ATTORNEY

INVENTOR.
ARTHUR A. COLLINS
JOHN DAN HILL
BY Bruce C Lutz
ATTORNEY

DATA EXCHANGE AND COUPLING APPARATUS

THE INVENTION

The present invention is directed generally to electronics and more specifically to communications. Even more specifically, the present invention is directed toward a technique of extracting data from a multiplexed data stream for insertion in a closed loop data bit stream communication channel.

As will be ascertained from other applications referenced infra, the present invention is utilized in a system employing a new concept. The prior art employed data processors and peripheral equipment on a point-to-point basis. A system in which the present invention is employed is theoretically infinitely expandable for utilizing a plurality of processors, storage means, and peripheral operated devices in a time division exchange or multiplex loop wherein there is full accessability and signal connection between all units, and where there is an allocation of a work on a dynamic basis.

It was determined that the operation of a great many units on one loop would slow down the total transmission time of data from one unit to another unit. The present invention is a result of an attempt to minimize the magnitude of the delay time of data circulating in the loop. Accordingly, within the concept of the system a second loop is provided which provides a single unit of delay time while still operating a plurality of units. The units being operated on this auxiliary loop must of necessity operate at a lower speed than is possible for the units on the main loop. In one embodiment of the invention the devices on the main loop each operated at a channel rate of 2 MHz or higher while devices on the auxiliary loop operated at a channel rate of 7.8125 kilobits per second or higher up to a maximum of 250 kilobits per second.

It is therefore an object of the present invention to provide a device for creating an auxiliary data communication loop operating in conjunction with a main, higher speed data loop.

Figure 1:
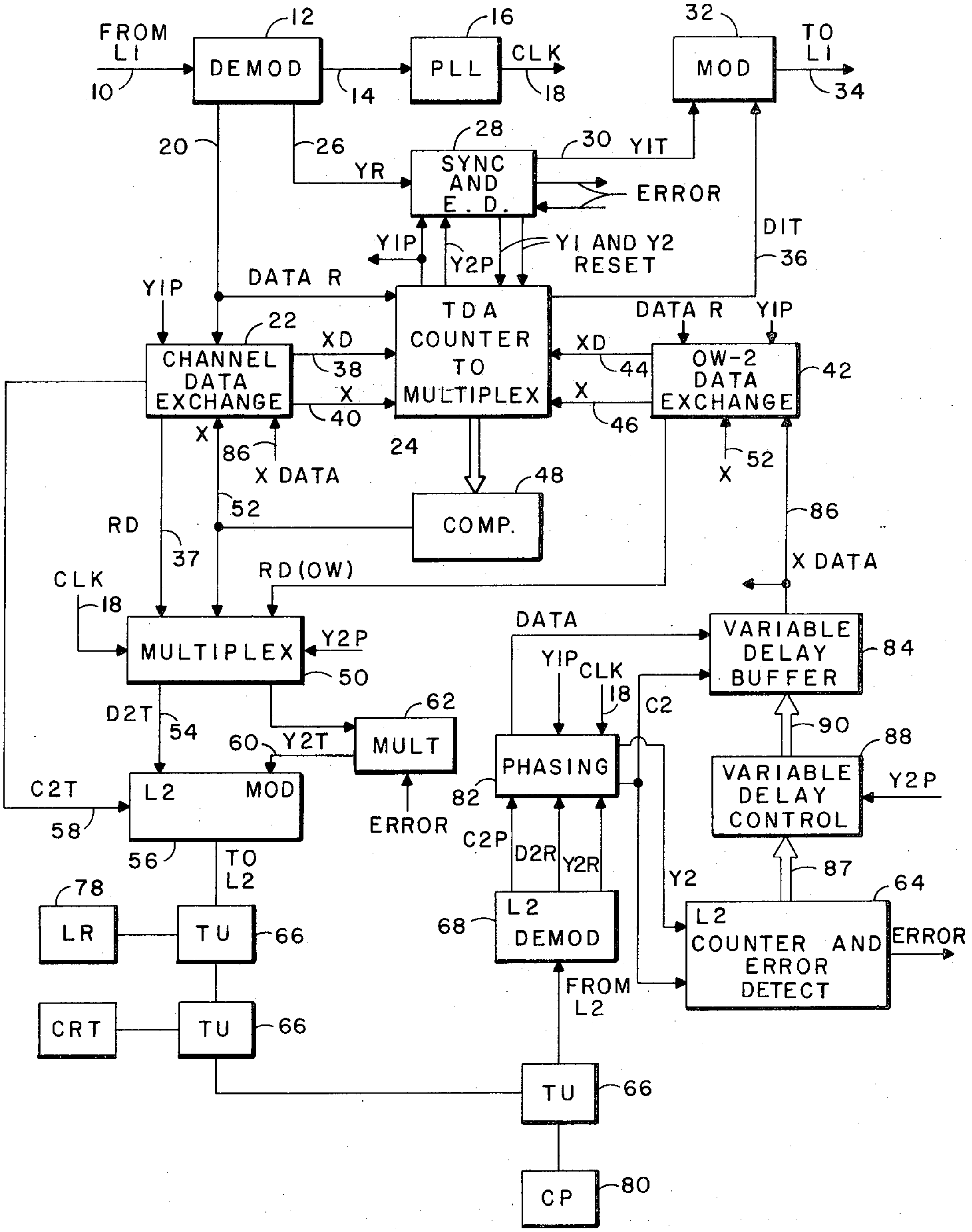
Figure 2:
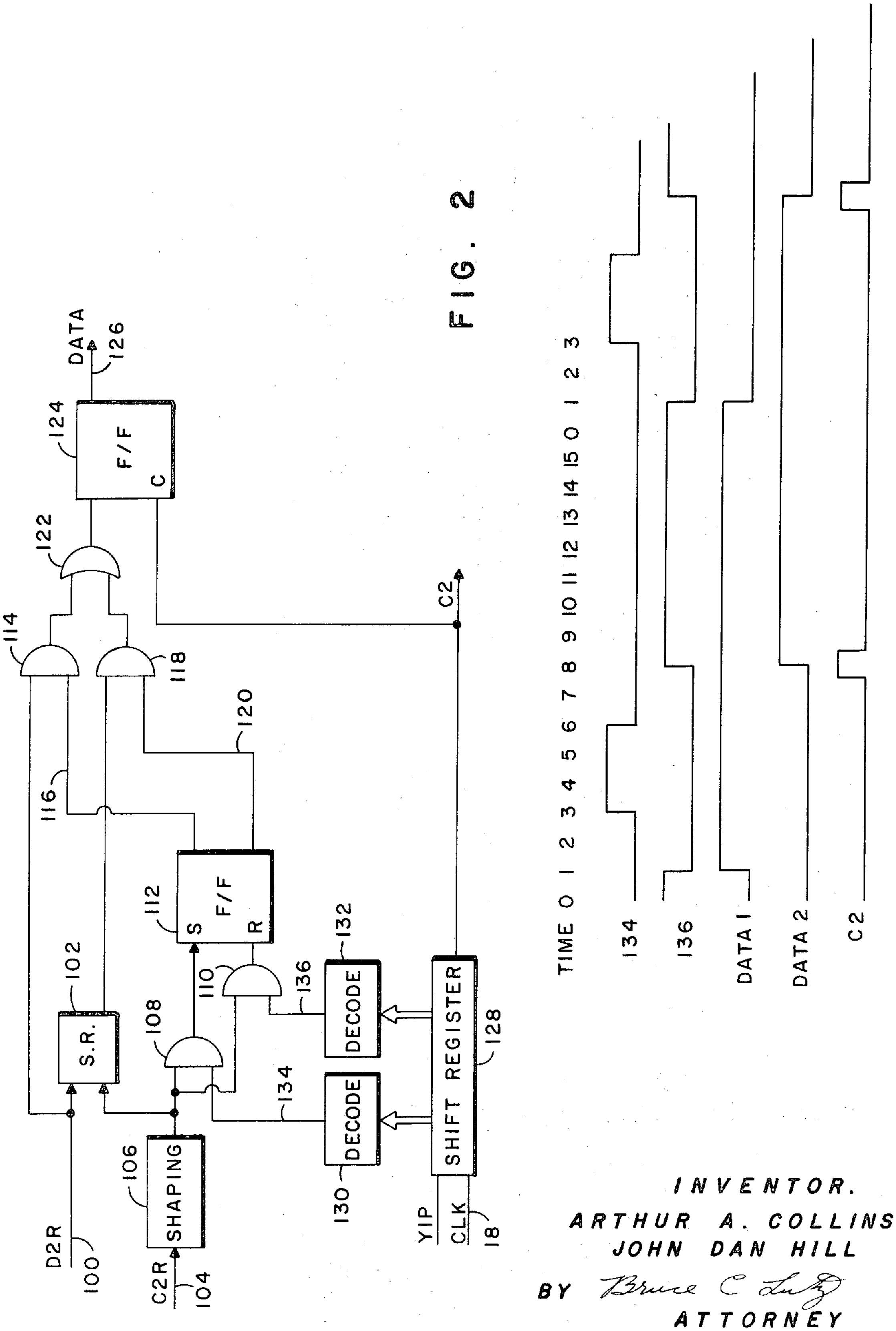

Other objects and advantages may be ascertained from a reading of the specification and appended claims in conjunction with the drawings wherein:

FIG. 1 is a block schematic diagram of the coupling apparatus including an auxiliary loop but without details as to the rest of the main loop; and FIG. 2 is a detailed block diagram of a portion of FIG. 1.

The embodiment to be described was designed to operate in a system where the data bits are multiplexed. The bits are retrieved one at a time to form words. The system operated at 32 MHz or 32 million bits per second with 16 separate time slots each containing a data bit for a different word. Each of the time slots were designated as channels. Thus, there were channels ranging from channel 0 to channel 15 and the data bits in a particular channel occurred at the rate of 2 million bits per second. The time period for the occurrence of 16 channels was designated as a frame. 256 frames were designated as a frame group. A Y1 sync pulse occurred every 16 channels during channel 0 and could be detected by the fact that it was a half-amplitude pulse rather than a full amplitude. The data information on the other hand was bi-phase modulated. A further synchronizing pulse called Y2 occurred every 256 frames or every frame group. Further information on this system and an amplification of the above information may be found in material already distributed by Collins Radio Company and in several patent applications all assigned to the assignee of the present invention including an application entitled, "Data Loop synchronizing Apparatus" by John Dan Hill, filed on Aug. 6, 1970 and having Ser. No. 61,559. A second application is entitled "Terminal Unit Data Detection and Exchange Apparatus" in the names of John Dan Hill and Arthur A. Collins, filed on Sept. 23, 1970 and having Ser. No. 74,670, and another application is entitled "Expandable Communication Apparatus" in the name of Arthur A. Collins filed on the same day as the present application and having Ser. No. 74,783. Some of these applications reference further applications which may be utilized for background material.

The purpose of the present invention is to remove data from a given channel in the main loop for application to an auxiliary loop and exchange therefor further data which is received from the auxiliary loop. In the embodiment to be described, the auxiliary loop can theoretically operate 255 different units, while maintaining communication between devices and processors on the auxiliary loop. This is possible because there are 256 distinct time slots between Y2 synchronizing pulses with one time slot utilized for the referenced communication between the processors and the various devices. The concept of this communication is called orderwire two. Additional published material can be obtained from the assignee of this invention describing the concept. The additional information pertaining to orderwire two will not be included herein since it does not form a part of the present invention but is rather, as indicated above, a communication technique. In actual operation of one embodiment, the addressing was designed and limited such that only 65 different units could be operated on a given auxiliary loop. In such a situation each of the auxiliary units may operate at a higher bit exchange rate than once every 256 pulses. In other words, the various units are retrieving data bits more than once every Y2 pulse or frame group.

DESCRIPTION

Signals are received from the L1 loop or main data stream via lead 10 in demodulator 12. An output of demodulator 12 on lead 14 is an unfiltered clock signal which is supplied to a phase lock loop 16 to remove jitter. An output 18 of phase lock loop 16 is a filtered clock signal which is supplied to most of the rest of the blocks in the circuit. However, this clock signal is only shown applied to blocks in which the clock signal is discussed in an attempt to keep the drawing simple and make it easier to understand. A receive data (Data R) output from demodulator 12 appears on line 20 and is supplied to a channel data exchange block 22 and to a time division address counter and multiplexing circuit 24. Received sync pulses (YR) are supplied on a lead 26 to a sync and error detection circuit 28. The sync circuit 28 receives Y1 and Y2 predict pulses and transmits Y1 and Y2 reset pulses from and to the TDA counter 24 in a manner similar to that described in the loop synchronizing application referenced above. The sync circuit 28 also has a Y1 transmit output signal on lead 30 which is supplied to a modulating means 32. An output of modulating means 32 is connected to the L1 loop and is designated as 34. Naturally, the modulator as well as many other blocks receive a clock signal as mentioned above but such is not shown since it is not specifically essential to the inventive concept being described and claimed. The sync outputs of the TDA counter 24 are also supplied to various other blocks such as channel data exchange 22. Again, such connections will not be shown for the purpose of simplicity. Data to be transmitted on L1 (D1T) from the multiplexing unit 24 is supplied on lead 36 to modulator 32. The channel data exchange block 22 supplies exchange data XD and exchange timing X signals on leads 38 and 40, respectively, to the multiplexing circuit 24. An orderwire two data exchange block 42 supplies similar data and timing signals to the multiplexing circuit 24 on leads 44 and 46. As shown the exchange unit 42 receives data and synchronizing signals Data R and Y1P. A comparison circuit 48 receives a plurality of leads from the counter and multiplexing unit 24 and supplies timing signals (X) to the data exchange unit 22 and 42 as well as to a further multiplexing means 50. The multiplexing means 50 also receives loop 1 data (RD) from the exchange means 22 as well as from the data exchange unit 42 which detects orderwire data [RD(OW)].

As may be determined thus far, the described apparatus operates much the same as that described in the above referenced terminal unit application except that two data paths are provided. Most of the data received on line 10 continues on line 20 through the multiplexing circuit 24 and out lead 36 to the modulator 32 and back to the loop on lead 34. However, every predetermined time period, such as the channel 4 time period, data is stored in exchange unit 22 and an output is supplied on lead 37 to the multiplex means 50. If, during the predetermined time period, no exchange is to take place, which occurs only during OW-2 period, the data on lead 38 is ignored. However, if there is an exchange to take place, the data on lead 38 (which comprise timing pulses representing the data on lead 86) will be inserted in the data on lead 20 to produce D1T on lead 36.

Timing signals from comparator 48 are applied via lead 52 to the data exchange 22, the multiplex circuit 50 and the data exchange 42. The signals applied to exchange blocks 22 and 42 are utilized for the purpose of sampling the signals at the proper (but different) times and are used in multiplexing circuit 50 for switching multiplex 50 from receiving the data from exchange 22, as it normally would, to receiving data from exchange 42 for one frame per each frame group. The clock input appearing on lead 18 to multiplex 50 provides the signal to retrieve the data from the storage sections in the exchange units 22 and 42.

During this channel 4 time period, data on lead 20 is blocked from direct application to the multiplex unit 24 which instead retrieves data from lead 38 and supplies it to lead 36 to be placed in the data stream of the main loop.

As referenced above, in the embodiment being described, the orderwire two data appears only on channel 0 and only once during each frame group. Thus, at each predetermined time interval of channel 0 operation, the multiplex unit 24 refuses to receive data on lead 20 and instead receives data on lead 44.

The comparator 48 of the present invention is constructed on the same basis as the similar comparators of the terminal unit application. The data exchange blocks basically comprise the sample and store, and wave shaping unit of the above-referenced terminal units.

After the two data streams are received by multiplexing unit 50, they are multiplexed together and supplied on output lead 54 with the aid of the timing pulses received from 48, 22, and 42 to a loop 2 modulator 56. The modulator 56 must also receive clock signals on a lead 58 and synchronizing signals on a lead 60 from the exchange 22 and the multiplex unit 50, respectively, through a multiplex unit 62. Multiplexing unit 62 receives error input signals from both the error detector 28 and from a loop 2 counter and error detector 64. An output from modulator 56 is supplied through a plurality of terminal units 66 back to an input of a loop 2 demodulator 68. The first terminal unit 66 is shown connected to a line printer 78 while the second terminal unit is connected to a cathode ray tube. The final disclosed terminal unit 66 is shown connected to a card punch 80. Demodulator 68 has various outputs providing loop 2 clock, sync, and data signals to a phasing circuit 82. Phasing unit 82 supplies data through a variable delay buffer 84 to the two data exchange blocks 22 and 42 on a lead 86. The phasing block 82 receives loop 1 clock and Y1 predict input pulses for the purpose of frame control timing respectively of the input data signals. The phasing block 82 also has loop 2 derived sync and clock output signals supplied to the L2 counter and error detector 64 which supplies a plurality of outputs 87 to a variable delay control 88. Control 88 supplies further signals 90 to buffer 84.

The error detection portion of block 64 provides error signals both to the block 28 and to the multiplexing unit 62. As previously indicated an output of error detector 28 is also supplied as an input to block 62. Although block 62 is only shown as having one input, these two inputs are OR'd inside unit 28 and presented to the appropriate circuitry in multiplex 62. If either error detector detects a lack of synchronization, an output is provided so that extra sync pulses are provided to leads 60 and 30. This produces amplitude modulation of the data bits being supplied to loops L1 and L2 and thus puts all of the units in the system on notice that there is a lack of synchronization. Each of the terminal units in the system is prevented from operating for a predetermined time after removal of the extra sync pulses to assure that the entire system is once again in synchronization. In actual practice and under normal operation the extra sync pulses need be inserted only when the system is modified by the addition of extra terminal units or upon start up of the system operation.

The data returning from loop 2 is bi-phase and amplitude modulated in much the same fashion as described in the above referenced applications. However, the data on loop 2 is square wave rather than sine wave as in loop 1. Thus, the timing of this data can be corrected by utilizing the clock signals appearing on lead 18 to phasing network 82 to match the data signals to the timing of the loop coupler for eventual transmission into the respective data exchange block 22 or 42. The Y1 predict pulses are used to correct the data to the proper frame timing. The counter 64 provides a frame count using the sync pulses received from the loop 2 signals as the reference. Upon occurrence of the Y2 predict pulse in the storage means 88, the count in counter 64 is sampled and stored. The stored count in control means 88 is then utilized to set the delay in a delay matrix comprised of a plurality of serially connected delay units so that data received from the loop is delayed the right amount of time to be inserted into loop 1 in the frame (channel 0 or channel 4 in the embodiment described). Basically, the blocks 64, 82, 84, and 88 cooperate to make the total frame delay of the signals passing through loop 2 and buffer 84 equal to an integral number of frame groups for resynchronization purposes.

The loop coupler provides four bits of delay for the data which is being supplied on channels other than that being used by the loop coupler. In the cited example, the data of channels 0–3 and 5–15 experience only four bits of delay. The remaining bits on channel 4 and the periodic bit for orderwire two experience a delay which may theoretically be any integral number of frame group time periods.

The data which is supplied to the auxiliary loop experiences approximately one frame delay between the time it enters demodulator 12 and the time that it is supplied from the output of modulating unit 56. If the rest of the delays in loop 2 are slightly more than one frame group period, the above referenced frame group synchronizing means will provide enough delay in block 84 to produce a full two frame group time period delay in between subtraction of data from the loop 1 and the resubmission of substantially the same data or substitute data back onto loop 1 via modulator 32.

While some of the leads from one block to another have been shown as cables, some of the other single line leads actually provide a plurality of signals. Therefore, the showing of a single lead is not to be considered to be restrictive.

As indicated supra, the purpose of the phasing circuit 82 is to provide frame timing. In FIG. 2 more detail is shown as to the contents of block 82 of FIG. 1. Since all the rest of the blocks have been disclosed in the referenced applications or are easily found in the prior art, this is the only block which is being described in greater detail.

As will be noted, an input 100 labeled D2R supplies data signals to a shift register 102. Shift register 102 in effect provides a one-half bit period delay of the auxiliary loop bit. Thus, it would be delaying the signal for a time period equivalent to eight bits or one-half frame of the main loop. A second input 104 labeled C2R provides auxiliary loop clock signals to a shaping circuit 106 for squaring the signals. The output of shaping circuit 106 provides a second input to shift register 102, provides a first input to an AND gate 108 and an input to a second AND gate 110. Outputs of the two AND gates 108 and 110 provide set and reset inputs to a flip-flop 112. The input 100 is also applied to an AND gate 114 which receives a second input on a lead 116 from flip-flop 112. An output of shift register 102 provides one input to an AND gate 118 which receives another input on a lead 120 from flip-flop 112. The outputs of the two AND gates 114 and 118 are supplied through an OR gate 122 to an input of a flip-flop 124 which supplies data on an output lead 126.

The inputs and outputs of the circuit of FIG. 2 are provided with the same designation as shown in FIG. 1. Accordingly, a shift register 128 receives Y1 predict (Y1P) and clock signals at the input and provides a C2 clock output. This C2 clock output is also provided as a clock input on the flip-flop 124. In addition, shift register 128 provides a plurality of signals to first and second decoding circuits 130 and 132. The two decoding circuits may comprise a plurality of AND gates so that they are in an ON condition for a predetermined amount of time in accordance with the count of the shift register. An output on lead 134 of decode circuit 130 is provided to AND gate 108. An output 136 of decode 132 is provided as a second input to AND gate 110. The timing diagrams of FIG. 2 show waveforms 134 and 136 indicative, respectively of the signals appearing on the output leads of the decode circuits. In accordance with standard notation, and AND circuits provide an output with two positive inputs. Thus, AND circuit 108 will provide an output when a clock appears during the interval between time periods 3 and 6 while AND gate 110 will provide an output to reset flip-flop 112 when a clock signal from shaping circuit 106 is received between time periods 8 and 1. The time between adjacent time interval notations equals one bit period on the main loop. Thus, the interval from time 1 to time 1 is equivalent to one bit period on loop 2. The purpose of the circuit is to prevent C2 from occuring at a time when the polarity of the data signal is indeterminate. Two data waveforms are shown as Data 1 and Data 2 and are to be considered in the alternative and not in the combination. In other words, the circuit is designed to leave the timing as is if the clock signal C2 appears in approximately the position shown with respect to data which has the waveform as approximately shown as Data 1. However, if the clock signal C2 should occur during the time that the data may change in polarity as shown with respect to Data 2, the flip-flop 112 will be set or reset as the case may be so that the data will be altered from passing through one of the AND gates 118 and 114 and transferred to the other. As indicated above, the shift register 102 has a delay equivalent to one-half of an L2 bit period and thus with the condition as Data 2 and C2, the change would place the clock and data signals as shown in the two waveforms C2 and Data 1.

It should be noted that, in the following description of operation, there is no timing relationship intended between the pair of waveforms 134 and 136 and the remaining waveforms.

In operation, if the clock signal C2R, which occurs during the middle of the data signal appearing on 100, occurs during time periods 1–3 and 6–8, there will be no positive signals at the alternate leads of either AND gates 108 and 110 and nothing will change in the circuit. During these times the data appearing on 100 can be applied either directly to the output 126 or delayed one-half bit by shift register 102 and there will still be no ambiguity in operation of the rest of the circuitry due to the time of occurrence of clock pulse C2 and the data appearing on lead 126. However, if the clock pulse C2R occurs during time period 3–6 the AND gate 108 will provide an output to set flip-flop 112, if it is not already set, so that AND gate 114 will provide an input and the data will not be delayed. On the other hand, if the clock input C2R occurs during time periods 8–1, the flip-flop 112 will be reset so that the data incoming signals will be provided through the shift register 102 and delayed one-half bit before being applied to the output 126.

The phasing block 82 in FIG. 1 shows a second input Y2R and a second output Y2. The phasing circuit 82 actually contains two circuits as shown in FIG. 2 operating simultaneously, one for removing possible ambiguity from the data signals and the other for removing possible ambiguity from the synchronization signals.

In summary, data is retrieved from a main communications loop via demodulator 12 and supplied through a multiplexing unit 24 to a modulator 32 a majority of the time. This data is merely delayed in the multiplexing unit a short amount of time, in the order of two data bit time periods, before retransmission into the main loop. Periodically, data is stored and now data is exchanged therefor in the exchange blocks 22 and 42. The data to be exchanged is supplied to multiplexing unit 24 and it is there substituted in the time slot, such as the channel 4 time slot, to be inserted in the main loop. The stored data is then periodically sampled at a rate equivalent to the frame rate and supplied to a further multiplex 50. This multiplex unit 50 combines the data from channel 4 and the orderwire data from channel 0 into a serial bit multiplex configuration. This multiplexed data is supplied on the auxiliary loop 2 to the various devices contained thereon. The data bits appearing on loop 2 are much longer in duration than the data bits on loop 1. In the embodiment disclosed, the data bits on loop 2 have a time period equal to one frame of the data in loop 1. The loop 2 data bits, even though individually the length of the loop 1 frame, are still interlaced with other data bits so that it may take several frame groups before enough data bits are received to form a word. The terminal units on loop 2 count the time from the synchronizing pulse until their time division address at least once each frame group period if the device is operational. At times data will be exchanged for the removed data and this information continues around the loop and through the other terminal units, which may be removing data for their devices from different time periods in the frame group, until the data is returned to demodulator 68. The data is then resynchronized to the timing of the main loop by delaying it so that the total delay is an integral number of frame groups, somewhat in the same manner as described in the above-referenced loop synchronizing apparatus before being supplied to the data exchange blocks 22 and 42 for exchange with further data in the appropriate time period.

If a single loop coupler is utilized with a main communication loop, there will be, in the embodiment described, 15 short loops and one long loop which includes (short and long referencing to time rather than physical dimensions) the terminal units connected to the auxiliary loop. The system may be designed so that more than one loop coupler is connected to other channels such as channel 8 and 12 to retrieve data for other auxiliary loops. As will be realized by those skilled in the art, terminal units such as 66, which need only demodulate at a low speed such as 2 MHz, are much easier and less expensive to design than terminal units which must operate at the main loop rate of 32 MHz. Therefore, the loop coupler concept not only minimizes message transmission times for a majority of the channels but greatly reduces the cost of connecting low speed peripheral equipment to the communication link.

This concept thereby enables a system to communicate with a large number of low speed devices, wherein a large amount of time delay is not particularly important, while still communicating with higher speed devices on the remaining channels where the large amount of time delay to communicate with all the devices on the auxiliary loop would become intolerable.

While a single embodiment of the invention has been disclosed, it is to be realized by those skilled in the art that the concept presented is applicable to data word as well as data bit retrieval, transmission and exchange. I thus wish to be limited only to the concept as presented in the appended claims.

We claim:

1. Apparatus for use with a communication line used for multiplexed data transmission wherein data occurs as a plurality of periodically recurring interlaced data channels comprising, in combination:

means for periodically sampling and storing data occurring during the time period of a data channel, comprising tow separate units for removing data at different predetermined time slots and further comprising multiplexing means for interlacing said data before transmission to said closed loop;

means for supplying said stored data to a closed loop wherein the supplied data is presented to the closed loop in a multiplexed format comprising a plurality of interlaced data channels recurring on a lower frequency rather than the data channels of said communication line; and means for receiving data from said closed loop and for exchanging said received data in said predetermined time slot in place of the stored data, comprising two separate units for exchanging the data in the different predetermined time slots.

2. Apparatus for use with a multiplex communication link comprising, in combination:

input and output means for providing input signals to and output signals from the apparatus;

demodulating means;

multiplexing means;

modulating means;

means connecting said demodulating means, said multiplexing means and said modulating means between said input means and said output means so that multiplexed signals will pass uninterrupted therebetween a majority of the time;

data exchange means for periodically storing signals supplied by said demodulating means, preventing acceptance of said signals by said multiplexing means and substituting therefor new signals to be multiplexed into the portion of the communication link signals previously occupied by the stored signals;

signal loop means including a plurality of serially connected load means for accepting the stored signals from said data exchange means in serial multiplexed format for transmission to said load means and for returning substitute signals to said data exchange means; and said data exchange means comprising first and second units each of which periodically stores signals occurring at different relative periodic times and also comprising further multiplex means for combining the output signals of said first and second units before transmission to said signal loop means.

3. Apparatus as claimed in claim 2 wherein said data exchange means further includes variable delay means for delaying the signal, before substitution, an integral number of time periods, wherein a time period is equal to the time between storing signals by one of said data exchange units.

4. Apparatus as claimed in claim 2 wherein said signal loop means includes modulation means and demodulation means at the accepting and returning portions thereof.

5. Apparatus for use with a multiplex communication link comprising, in combination:

input and output means for providing input signals to and output signals from the apparatus;

demodulating means;

multiplexing means;

modulating means;

means connecting said demodulating means, said multiplexing means and said modulating means between said input means and said output means so that multiplexed signals will pass uninterrupted therebetween a majority of the time;

data exchange means for periodically storing signals supplied by said demodulating means, preventing acceptance of said signals by said multiplexing means and substituting therefor new signals to be multiplexed into the portion of the communication link signals previously occupied by the stored signals;

signal loop means including a plurality of serially connected load means for accepting the stored signals from said data exchange means in serial multiplexed format for transmission to said load means and for returning substitute signals to said data exchange means; and error detection means for supplying extra synchronization signals to said signal loop and to said multiplex communication link upon detection of synchronization errors in either said communication link or said signal loop means when the multiplex signal being transmitted by said communication link includes periodically recurring synchronization signals.

6. Apparatus as claimed in claim 3 wherein said communication link is a closed loop and wherein said multiplex signals are amplitude modulated for synchronization and are phase modulated for data comprising, in addition:

phase lock loop means connected to said demodulating means for receiving clock signals therefrom and for removing time occurrence jitter therefrom.

7. The method of forming an auxiliary data stream loop in combination with a main data stream loop in a communication system using multiplexed data in a serial bit stream wherein the bit stream comprises a plurality of periodically recurring data channels comprising the steps:

passing said serial bit stream of said main loop through a multiplexing circuit means connected therein;

periodically preventing a predetermined amount of data from being passed through said multiplexing means and instead transmitting said predetermined amount of data through the auxiliary loop comprising a plurality of devices and associated terminal units;

substituting new data from said closed loop to be inserted in said serial data bit stream of said main loop in place of the removed data;

detecting the occurrence of periodically recurring synchronization signals for occurrence only at specific times in either of said main or auxiliary data loops; and producing extra synchronization signals in both of said loops upon detection of a synchronization error in either of said loops.

6. Apparatus as claimed in claim 3 wherein said communication link is a closed loop and wherein saidmultiplex signals are amplitude modulated for synchronization and are phase modulated for data comprising, in addition:

phase lock loop means connected to said demodulating means for receiving clock signals therefrom and for removing time occurrence jitter therefrom.

7. The method of forming an auxiliary data stream loop in combination with a main data stream loop in a communication system using multiplexed data in a serial bit stream wherein the bit stream comprises a plurality of periodically recurring data channels comprising the steps of: PASSING SAID SERIAL BIT STREAM OF SAID MAIN LOOP THROUGH A MULTIPLEXING CIRCUIT MEANS CONNECTED THEREIN:

* * * * *